(12) United States Patent
Farrar et al.

(10) Patent No.: US 7,246,702 B2
(45) Date of Patent: Jul. 24, 2007

(54) DISK HOLDER

(75) Inventors: Peter Antony Farrar, Leeds (GB); Anthony Henry Joseph Fraser, Rutland (GB); Stefan Alexander Pijanowski, Northants (GB); Mark Edward Schiek, Mt. Airy, MD (US); Stephen Geoffrey Unwin, Islip (GB)

(73) Assignee: Dubois Limited, Northants (GB)

( * ) Notice: Subject to any disclaimer, the term of this patent is extended or adjusted under 35 U.S.C. 154(b) by 0 days.

(21) Appl. No.: 10/399,052

(22) PCT Filed: Oct. 11, 2001

(86) PCT No.: PCT/GB01/04553

§ 371 (c)(1),
(2), (4) Date: Nov. 3, 2003

(87) PCT Pub. No.: WO02/31831

PCT Pub. Date: Apr. 18, 2002

(65) Prior Publication Data

US 2004/0060834 A1  Apr. 1, 2004

(30) Foreign Application Priority Data

Oct. 11, 2000 (GB) ............... 0024890.6

(51) Int. Cl.
*B65D 85/30* (2006.01)
(52) U.S. Cl. ............... 206/308.1; 206/309; 206/493
(58) Field of Classification Search ............ 206/308.1, 206/309, 310, 311, 312, 313, 493, 232
See application file for complete search history.

(56) References Cited

U.S. PATENT DOCUMENTS

| 4,750,618 | A | * | 6/1988 | Schubert | 206/308.2 |
|---|---|---|---|---|---|
| 5,400,902 | A | * | 3/1995 | Kaminski | 206/310 |
| 5,848,689 | A | * | 12/1998 | Mueller | 206/308.1 |
| 5,896,985 | A | * | 4/1999 | Nakasuji | 206/308.2 |
| 6,016,909 | A | * | 1/2000 | Chang | 206/310 |
| 6,041,923 | A | * | 3/2000 | Furutsu | 206/308.1 |
| 6,065,593 | A | * | 5/2000 | Howerton et al. | 206/310 |
| 6,116,417 | A | * | 9/2000 | Yoshinaga et al. | 206/310 |
| 6,237,763 | B1 | * | 5/2001 | Lau | 206/308.1 |
| 6,241,089 | B1 | * | 6/2001 | Grobecker | 206/310 |
| 6,651,811 | B2 | * | 11/2003 | Hai | 206/308.2 |

* cited by examiner

*Primary Examiner*—Shian T. Luong

(57) ABSTRACT

Apparatus for holding a disk-shape data carrier (6), e.g. a DC or a DVD, having a central aperture, the apparatus comprising a base portion (5), disk engaging means (1, 2, 4) for releaseably engaging the central aperture of the data carrier (6), having retaining means (1) for engaging and retaining the data carrier (6) on the apparatus and release means (2, 4) which, when pressed, releases the engagement of the retaining means (1) with the data carrier (6) so the data carrier (6) can be removed from the apparatus, wherein removable security means (7) are provided to inhibit actuation of the release means (2, 4) to prevent release of the data carrier (6).

11 Claims, 6 Drawing Sheets

DISK HOLDER

TECHNICAL FIELD

This invention relates to an improved disk holder, and more particularly to a disk holder with a security device.

BACKGROUND OF THE INVENTION

Apparatus for holding a disk-shaped data carrier, such as a CD or DVD, are known. Examples of known apparatus are described in U.S. Pat. No. 5,788,068 and WO97/41563 the entire disclosures of which are incorporated herein.

A problem encountered with such known apparatus is the removal and theft of a CD or DVD from the apparatus within a store selling such products. The disk holder is usually provided within a container, which is also provided with a security tag that triggers an alarm if the container is taken out of the store without the tag first being removed or rendered inactive by staff in the store. The container may also be provided with a clear plastic wrapper, which has to be removed before the container can be opened. However, it has been found that thieves are able to slit the wrapper along an edge of the container, e.g. the bottom edge, actuate the release mechanism by pressing it through a side wall of the container to release the CD or DVD from the disk holder within the container. They are then able to remove the CD or DVD from the container by compressing the container so that the side walls bow, forming a gap between the two halves thereof, and the CD or DVD can then be slid out through the slit made in the wrapper. An experienced thief is able to do this whilst pretending to examine the product and slip the CD or DVD into a coat pocket unobserved. The thief can then leave the empty container on the shelf and leave the store with the CD or DVD without triggering the alarm system. Other ways of circumventing the security of known packages are known.

For this reason, many stores only display empty containers and when a customer has made a selection, the staff retrieve the relevant CD or DVD from a secure cupboard or safe and place it in the container for the customer. However, this takes additional time and requires a secure storage place for the CDs and DVDs. It also increases the risk that the wrong CD or DVD may be put in the container, especially if the staff are busy. There is therefore a desire within the trade to be able to display CD and DVD containers with the relevant CD or DVD already held therein; such containers are called 'live' containers within the trade. It has been shown that the display of 'live' containers can increase sales significantly.

One of the aims of the present invention is thus to improve the security of a live container housing a disk-shaped data carrier such as a CD or DVD.

DISCLOSURE OF THE INVENTION

According to a first aspect of the present invention, there is provided apparatus for holding a disk-shaped data carrier having a central aperture, the apparatus comprising:
   a base portion;
   disk engaging means for releasably engaging the central aperture of a disk-shaped data carrier, the disk engaging means having retaining means for engaging and retaining the disk-shaped data carrier on the apparatus;
   release means for releasing the engagement of the retaining means with the disk-shaped data carrier so the disk-shaped data carrier can be removed from the apparatus; and
   removable security means to inhibit actuation of the release member and thereby prevent release of the disk-shaped data carrier from the retaining member.

According to another aspect of the invention there is provided a security device for use with such apparatus.

According to a further aspect of the invention, there is provided a security device for preventing removal of a disk-shaped data carrier having a central aperture from a disk holder having disk engaging means for releasably engaging the central aperture of the disk-shaped data carrier, the device comprising one or more parts shaped to fit into one or more gaps formed between parts of the disk engaging means so as to inhibit actuation thereof.

According to yet another aspect of the invention, there is provided a package for containing or storing a disk-shaped data carrier comprising a holder having a base portion, disk engaging means on the base portion the base portion for releasably engaging the disk-shaped data carrier; and a security device that is removably engageable with the disk engaging means.

Preferred and optional features of the invention will be apparent from the following description and from the subsidiary claims of the specification.

BRIEF DESCRIPTION OF THE DRAWINGS

The invention will now be further described, merely by way of example, with reference to the accompanying drawings in which.

DESCRIPTION OF PREFERRED EMBODIMENTS

Depending on the requirements, the security devices described herein may be used to provide different levels of security for a live CD or DVD container. In one form, the security device may simply be arranged to make it more difficult to actuate the disk release mechanism through the wall of the container but can be readily removed when the container is opened. Where a higher level of security is required, the security device may be arranged so that although it is easy to install by sliding it in one direction, it is difficult to slide in the opposite direction and remove without use of a special tool or special equipment. Other variations of the security device which rely on a mechanism that inhibits actuation of the disk release mechanism are within the scope of the invention.

Figure 1A:
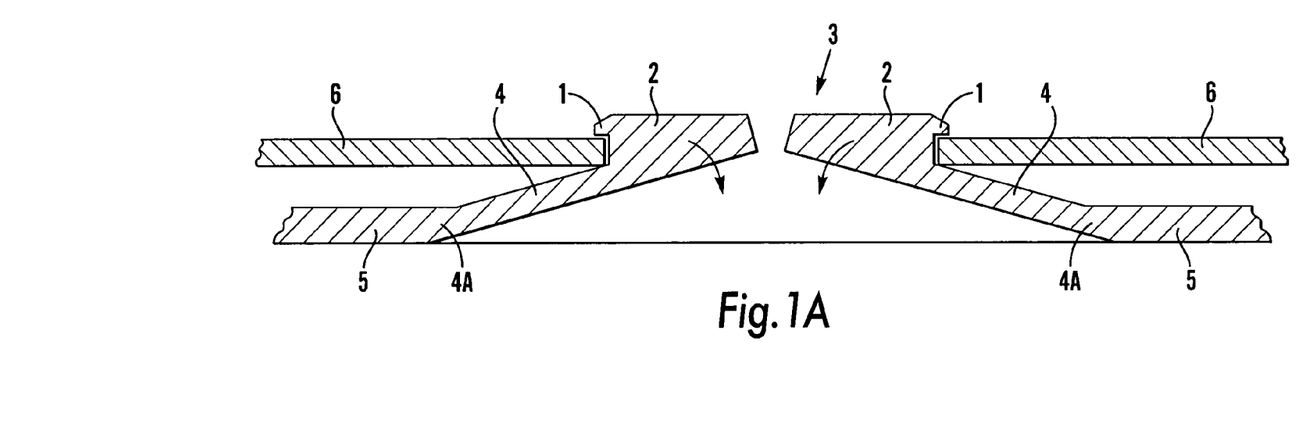
FIG. 1A is a schematic cross-sectional view through a disk engaging means for releasably holding a disk.
Figure 1B:
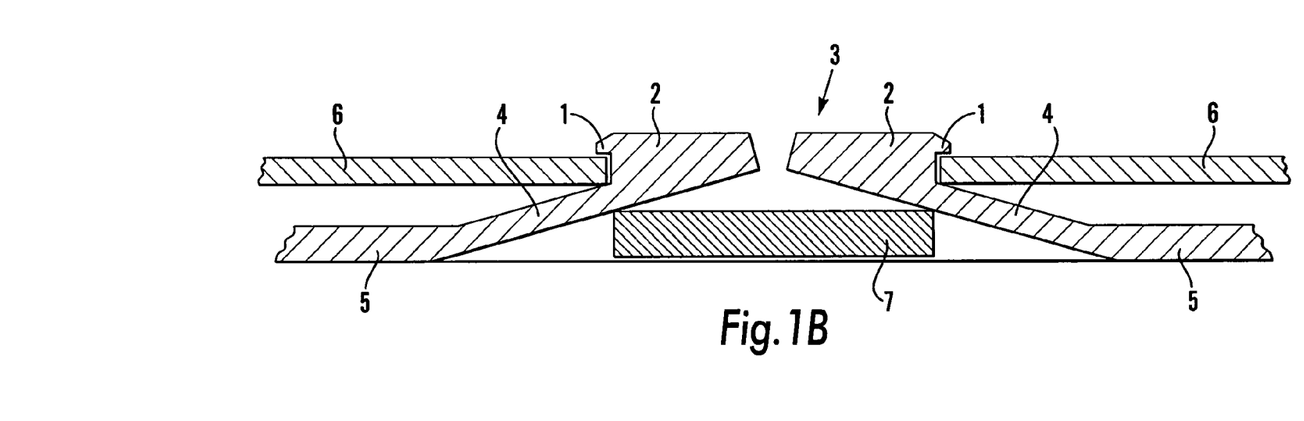
FIG. 1B shows a first embodiment of a security device according to one aspect of the invention, which is positioned to inhibit actuation of the disk engaging means.

FIG. 1A and 1B show a device similar to that shown in U.S. Pat. No. 5,788,068, previously herein incorporated by reference, comprising a retaining member in the form of projections 1 which project radially outwardly from button portions 2, which together form a button-like member 3. The button portions 2 are mounted at the radially inner ends of arms 4, which are resiliently cantilevered from a base portion 5. As described in U.S. Pat. No. 5,788,068, when the button-like member 3 is pressed, each button portion 2 and the projection 1 carried thereby moves about an arc approximately centered on the position 4A where the arm is connected to the base portion. As the projection 1 moves about the arc it simultaneously moves radially inwards and downwards towards the base portion 5. Whilst moving in this manner, the projections press down on the disk 6 adjacent the edge of the central aperture thereof and thus depress the center of disk 6 towards the base portion 5 until the projections have moved radially inward a sufficient distance to release their engagement with the disk 6.

Thus, it will be appreciated that during this action, the button portions 2 and the arms 4 are depressed in a direction towards the base portion 5, ie towards a position in which they would become co-planar with the base portion.

FIG. 1B shows one embodiment of a security device in the form of a flat strip 7 which is slid beneath the arms 4, so as to be positioned in a gap beneath the arms 4. The strip 7 thus prevents the arms 4 from being depressed. In view of the nature of the mechanism described above, pressure on the button-like member 3 will thus not release the disk 6, as in order for the projections 1 to be released from engagement with the disk 6, it is essential that the arms 4 be depressed so the projections 1 can move along an arc as described above.

It will be appreciated that the devices of the present invention require that connection between the button portions 2 and the respective arms 4 not to be too flexible, otherwise there is a danger that the button portions 2 may inadvertently be tilted inwardly and thus release the engagement of the projections with the disk.

The strip 7 may take a variety of forms. Preferably it is formed of a relatively tough plastics material such as Nylon™, polypropylene or styrene (the remainder of the device typically being formed of polyethylene or polypropylene) and has a thickness which enables it to be slid under the arms 4 but which prevents any significant depression of the arms 4 towards the base portion. In one embodiment, for instance, the strip may typically be about 1–3 mm thick. The strip should have a length sufficient to span the aperture in the base portion beneath the arms (this aperture being present to allow the arms to be formed in a one-shot injection molding process with the base portion) so that it is supported on the base portion on each side of the arms. Typically, the security device has a length of at least 20 mm. If such a short device is used, a special tool may be required to slide it into place after a disk has been mounted on the disk engaging means (as, once the security device is in place, it prevents the disk engaging means from receiving a disk). Alternatively, the security device can be slid in place via the aperture in the base portion beneath the arms.

The strip may have a greater length if it is to be connected to additional security devices and/or if it one end of it is to be accessible at a position beyond the periphery of the disk.

The strip may prevent the button portions or the arms from being depressed, or both. Instead of being a strip of plastic, the security device may take other forms, e.g. a U-shaped piece of metal wire (not shown) of appropriate thickness, with one leg of the U-shape under one arm and the other under the other arm. A simple form of this version of the device can be formed from metal wire such as that used to make a conventional paper clip.

In addition to the disk engaging means illustrated herein as having two arms, other versions of such disk engaging means may be fitted with the security devices of the invention. For example, the security device may be used with disk engaging means having just one arm or more than two arms, e.g. three arms. In the latter case, the security device preferably has a shape which enables it to be slid beneath the arms through a space between adjacent arms and is preferably supported at three points on the base portion, ie at points between each pair of arms.

Figure 1C:
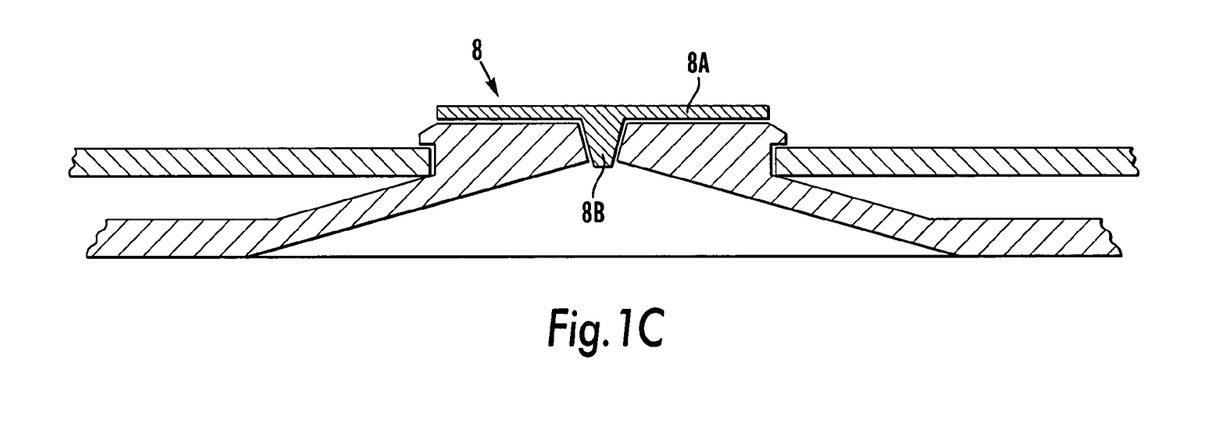
FIG. 1C shows a further security device positioned to inhibit actuation of the disk engaging means.

FIG. 1C shows a further security device 8 which fits in the gap between adjacent button portions 2. This form of the security device may comprise a cap 8A which fits over the button-like member 3 with a projection 8B on its underside shaped to fit into said gap. In this regard, the projection 8B may have a straight or linear configuration if it is to fit in the gap between two semi-circular button portions, or it may have an S-shaped profile if it is to fit the gap between two button parts having Yin-yang shapes (as shown in WO97/41563, which is herein incorporated by reference).

It will be appreciated from the description above of how the release mechanism operates that when the button portions move about the arcs described, they move radially inwards towards each other so that the button-like member 3 contracts and the gap between the button portions reduces in width. The security device shown in FIG. 1C fits snugly within said gap along at least a portion of the length of said gap, and so prevents the button parts from moving towards each other; this prevents the button-like member 3 from contracting when it is pressed. The projections cannot therefore move radially inwards to release their engagement with the disk. The shape and dimensions of the security device 8 may be varied depending on the corresponding shape and dimensions of the gap(s) between the button portions.

For example, such a device may be fitted to a button-like member comprising a plurality of button parts, e.g. two or three. In this respect, it may be sufficient for the device to fit into a gap between just one pair of button parts but preferably it will fit within the gaps between each pair of button parts.

In variations of this feature, each projection fitting into a gap between the button portions is preferably of a length such that the projection extends well into the gap and is preferably longer than the depth of each button portion. This extension beneath the button portions helps prevent accidental disengagement of the security device, e.g., when pressure is applied to the outside walls of the container.

Figure 1D:
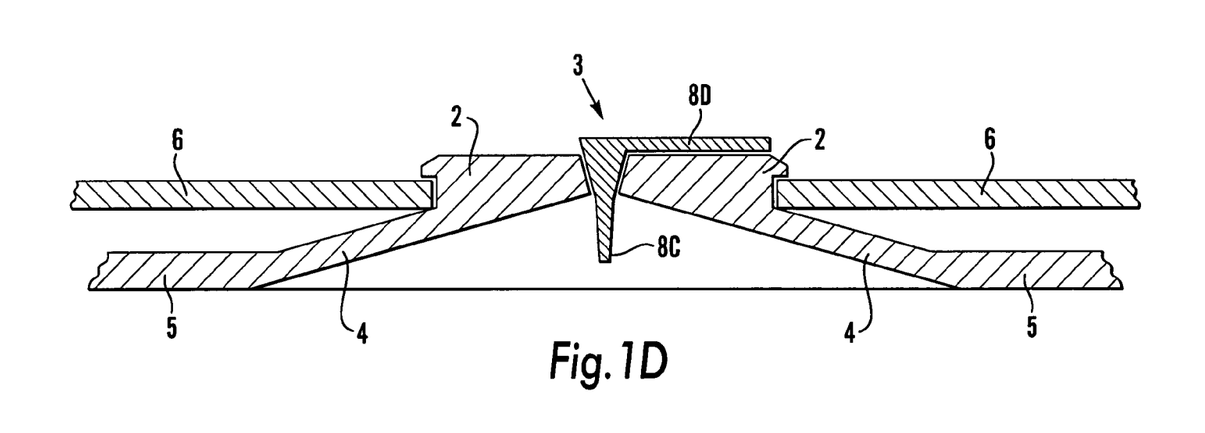
FIG. 1D shows a modified form of the further a security device positioned to inhibit actuation of the disk engaging means. The security device shown in FIGS. 1C and 1D may be used in addition to the security device shown in FIG. 1B.

As shown in FIG. 1D, the security device may be in the form of a hub insert that comprises a vertical projection 8C, which extends downward into a space beneath the button-like member 3. This projection 8C may be shaped so as to allow easy insertion and a secure fit into the gap between button portions 2; in this respect the configuration of the projection 8C is not limited. The projection 8C is further perpendicularly attached to a pull-tab 8D, which lies substantially co-planar with the disk 6 and the button-like member 3. The pull-tab 8D may be formed of a flexible material, and is thus instrumental for withdrawing the projection 8C from the gap formed between the button portions 2.

As indicated above, the security device shown in FIGS. 1C and 1D may be used in addition to, the security device shown in FIG. 1B.

The device represented in FIG. 1C or 1D may be completely contained within the interior of a disk package, and does not require any additional processing steps on the part of store retail staff to disengage the device after the package has been sold.

It will be appreciated that the security device shown in FIG. 1B prevents the button-like member 3 from being depressed, while that shown in FIGS. 1C and 1D prevents it from contracting. However, it will be appreciated that in each case, the mechanism prevents the button portions from pivoting downward (about axes located approximately where the arms join the base portion).

FIGS. 2A to 2C and 3A to 3C correspond to FIGS. 1A to 1C described above, but show slightly different forms of the releasable disk engaging means.

Figure 2A:
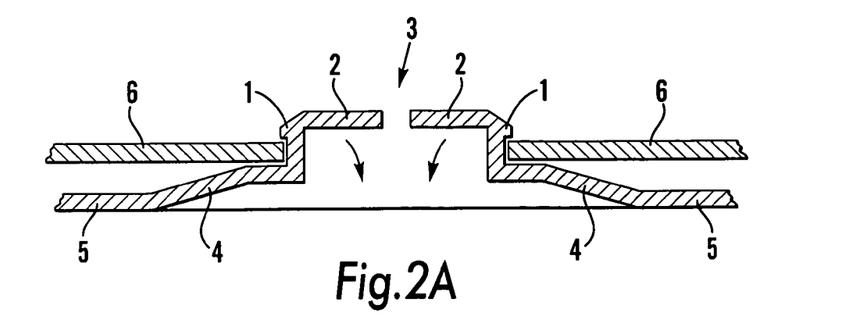
FIG. 2A is a schematic cross-sectional view through another form of a disk engaging means for releasably holding a disk.
Figure 2B:
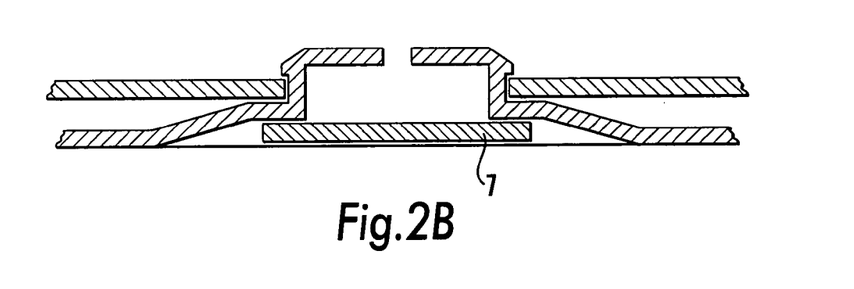
FIG. 2B shows a second embodiment of a security device according to one aspect of the invention, which is positioned to inhibit actuation of the disk engaging means.
Figure 2C:
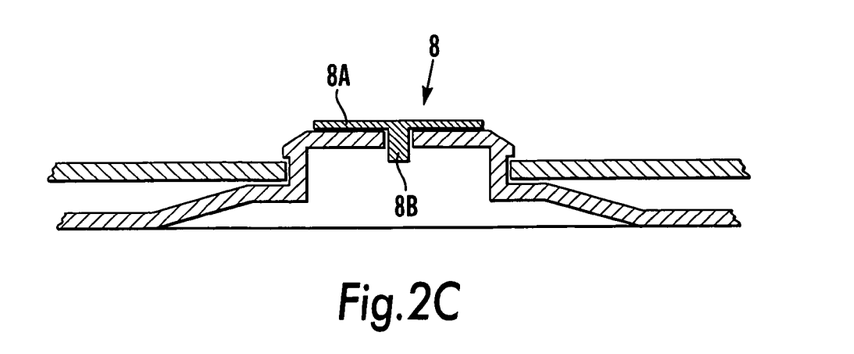
FIG. 2C shows a further security device positioned to inhibit actuation of the disk engaging means.

In FIG. 2 the arms 4 and the button portions 2 are of different shape to those shown in FIG. 1 but their function is very similar.

Figure 3A:
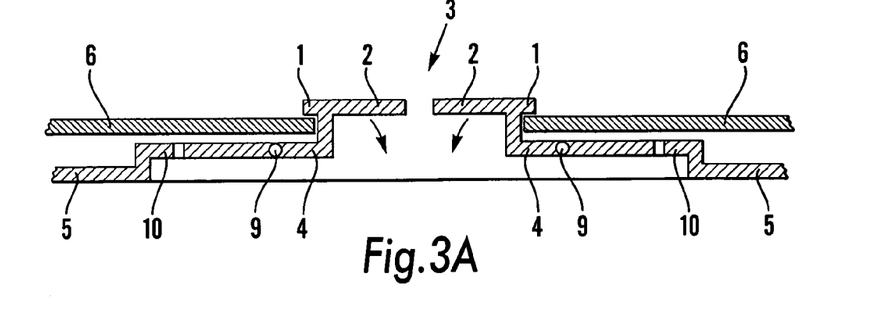
FIG. 3A is a schematic cross-sectional view through a further form of disk engaging means for releasably holding a disk.
Figure 3B:
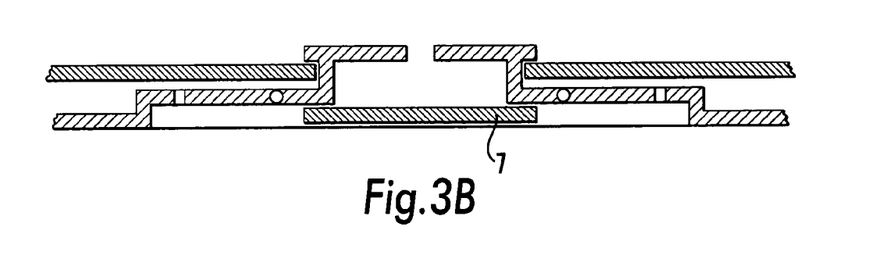
FIG. 3B shows a third embodiment of a security device according to one aspect of the invention positioned to inhibit actuation of the disk engaging means.
Figure 3C:
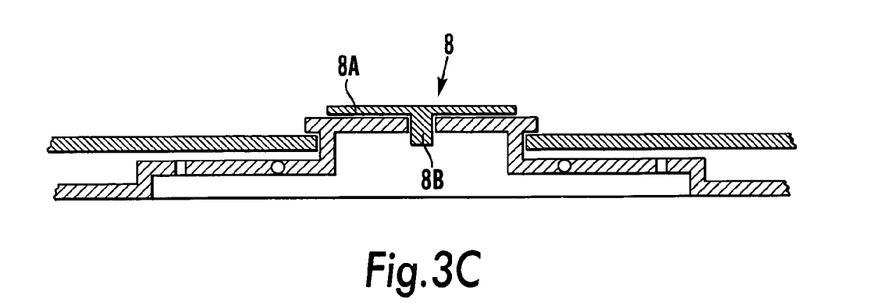
FIG. 3C shows a further security device positioned to inhibit actuation of the disk engaging means.

In FIG. 3, the button portions 2 are mounted on arms 4 which are pivotally mounted at positions 9 to a raised area 10 of the base portion 5 by torsion connections on each side thereof. These torsion connections may comprise thin plastic connections between the arms 4 and the base portion 5. Otherwise, the function of the security devices are similar to those described in relation to FIGS. 1 and 2.

Figure 4:
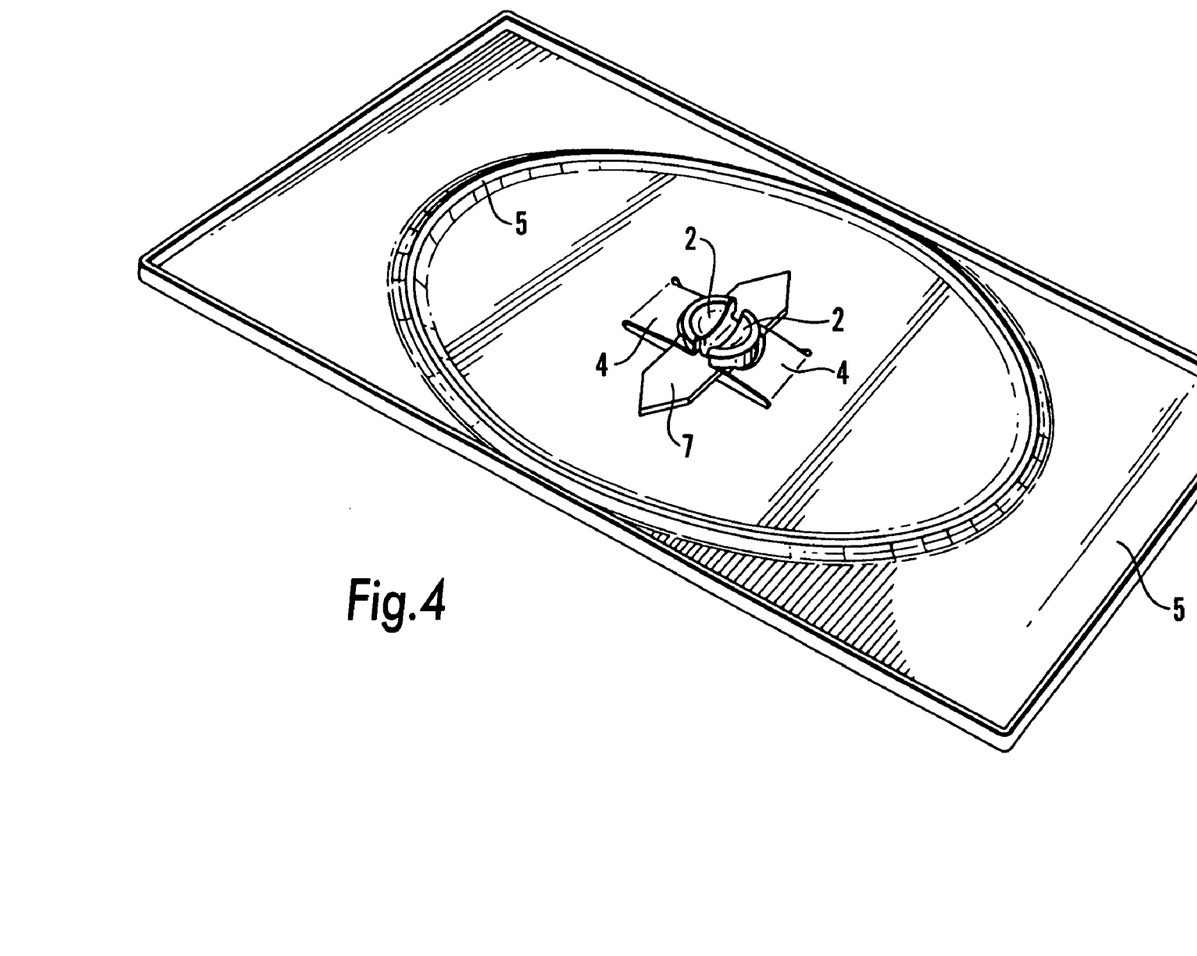
FIG. 4 is a perspective view of disk engaging means with a security device similar to that shown in FIG. 1B installed therein.

FIG. 4 shows a perspective view of the device shown in FIG. 1B. As shown in the Figure, the security device has a substantially rectangular shape with a point at one end (or both ends) to facilitate location of the device beneath the arms.

The security devices described above help secure the disk to the disk engaging means. These security devices may operate independently of closure of the container in which the disk engaging means is housed. In such a case, the container may be opened without compromising the security of the connection between the disk and the disk-engaging member. In such situations, the wrapper conventionally provided around the container may also be omitted.

Figure 5A:
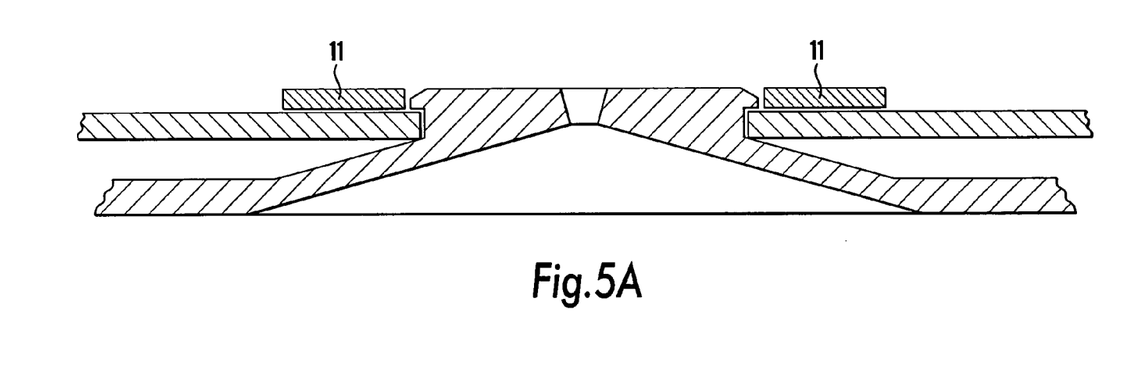
FIG. 5A is schematic cross-sectional view of disk engaging means similar to that shown in FIG. 1A, having engageably attached thereto a further security device, which is positioned to inhibit actuation of the disk engaging means through the wall of the container.
Figure 5B:
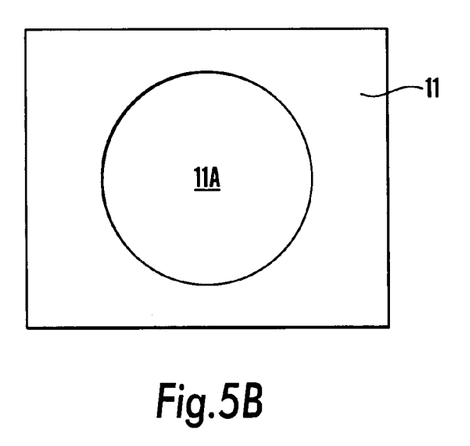
FIG. 5B is a plan view of this security device.

FIG. 5 shows another form of security device. As mentioned above, with some types of container it is possible to actuate the unprotected button-like member from outside the container by pressing a wall of the container lying over the button-like member. In most instances, the package wall is relatively flexible, and it can therefore be deflected enough to press against the button-like member. This effect can be prevented if a security device such as that shown in FIG. 5 is fitted about the button-like member before the container is closed. This security device comprises a substantially planar plate 11 with an aperture 11A therein as shown in FIG. 5B), the aperture being shaped to fit over the button-like member so the plate is fitted around the button-like member (as shown in FIG. 5A), the plate having a thickness similar to that of the button-like member. If the wall of the container is now pressed towards the button-like member, the security device prevents sufficient pressure being applied to the button-like member to release the disk. This is due to the fact that pressure applied to the wall of the container is applied to the security device and thus to the disk (in a similar manner to the pressure applied to the disk when it is installed on the disk engaging means). Another way of viewing this is that the security device maintains the part of the wall over the button-like member relatively flat so the wall cannot be deflected to the shape required to press and actuate the button-like member.

The security device shown in FIG. 5 typically has a thickness of 1 to 2 mm and a width of around 3 to 10 mm. The plate may be rectangular as shown, circular, or of some other shape.

The security devices described with reference to FIGS. 1 to 4 serve to secure the disk to the disk engaging means. In a preferred arrangement, a security tag of the type currently used to trigger an alarm if a product is removed from a store without the tag being rendered inoperative or removed may be positioned between the disk and a wall of the container so that the tag can only be removed once the disk has been released and removed.

As an additional feature, the security devices disclosed herein may be printed with text or graphic material according to any suitable technique known in the art. In this respect, the device may carry advertising, product information or cautionary messages, or may be of different colours or colour-coded to permit ready association with certain product classifications.

The security devices described above have the advantages of being simple and having little, if any, undesirable impact on the aesthetics of the container.

Several different embodiments of the security device are described above. It is believed that the present invention includes many other embodiments that may not be herein described in detail, but would nonetheless be appreciated by those skilled in the art from the disclosures made. Accordingly, this disclosure should not be read as being limited only to the foregoing examples or only to the designated preferred embodiments.

We claim:

1. Apparatus for holding a disk-shaped data carrier having a central aperture, the apparatus comprising:
   a base portion;
   disk engaging means for releasably engaging the central aperture of a disk-shaped data carrier, the disk engaging means having retaining means for engaging and retaining the disk-shaped data carrier on the apparatus;
   release means for releasing the engagement of the retaining means with the disk-shaped data carrier so the disk-shaped data carrier can be removed from the apparatus; and
   a removable security device installed by sliding the security device along the base portion between at least the release means and the base portion so its location therebetween inhibits actuation of the release means and thereby prevents release of the disk-shaped data carrier from the retaining means.

2. The apparatus of claim 1, in which the release means comprises a button-like member that contracts when pressed, and the security device comprises a security member that prevents contraction of the button-like member.

3. The apparatus of claim 2, in which the button-like member comprises a plurality of button portions with at least one gap therebetween, and the security member fits within the said at least one gap.

4. The apparatus of claim 1, in which the release means comprises a button-like member that depresses when pressed, and the security device comprises a security member which prevents depression of the button-like member.

5. The apparatus of claim 4, in which the security member fits between the button-like member and the base portion.

6. The apparatus of claim 5, in which the security means comprising a strip for fitting between the button-like member and the base portion.

7. The apparatus of claim 1, in which the release means comprises a button-like member, at least part of which pivots when pressed, and the security device comprises a security member that prevents pivoting of the button-like member.

8. The apparatus of claim 1, wherein the security means is printed with text or graphic material, or is coloured.

9. A package for containing or storing a disk-shaped data carrier comprising a holder having a base portion, disk engaging device on the base for releasably engaging the disk-shaped data carrier; and a security device that is removably engageable with the disk engaging device by sliding along the base portion between the disk engaging device and the base portion so as to inhibit actuation of the disk engaging device.

10. The package of claim 9, wherein the disk engaging device comprises a button-like member that contracts when pressed, and the security device comprises a security member that prevents contraction of the button-like member.

11. The package of claim 9, in which the disk engaging device comprises a button-like member which depresses when pressed, and the security device comprises a security member that prevents depression of the button-like member.

* * * * *